United States Patent
Teitelbaum et al.

[11] 3,866,473
[45] Feb. 18, 1975

[54] PRESSURE MEASURING TRANSDUCER

[75] Inventors: Bernard R. Teitelbaum, Birmingham; Lawrence E. Slimak, Troy, both of Mich.

[73] Assignee: The Bendix Corporation, Southfield, Mich.

[22] Filed: Aug. 4, 1969

[21] Appl. No.: 847,225

[52] U.S. Cl. .......................... 73/398 AR, 73/141 A
[51] Int. Cl. ............................................... G01l 9/02
[58] Field of Search .......... 73/398, 141 A; 338/4, 5

[56] References Cited
UNITED STATES PATENTS
2,384,437  9/1945  Boynton.................................. 73/81
2,442,938  6/1948  Ruge................................. 73/398 X
3,535,937  10/1970  Wiggins et al.................. 73/398 AR Primary Examiner—Donald O. Woodiel
Attorney, Agent, or Firm—John R. Benefiel

[57] ABSTRACT

A pressure measuring device comprising a U-shaped clamp which is easily and rapidly attached to or removed from a pressurized enclosure to measure pressure thereon by measuring deformation of the enclosure without breaking the surface of the enclosure. Deformation of the enclosure is measured by detecting changes in strain in the arms of the clamp by strain gage means. The device is insensitive to the effects of acceleration thereon.

29 Claims, 5 Drawing Figures

PATENTED FEB 18 1975 3,866,473

INVENTORS.
Bernard R. Teitelbaum
Lawrence E. Slimak
BY William E. Thornton
ATTORNEY.

PRESSURE MEASURING TRANSDUCER

BACKGROUND OF THE INVENTION

The present invention relates to a transducer for measuring the pressure exerted on an enclosure without breaking into the enclosure. It can also accurately detect and measure pressure exerted on enclosures undergoing acceleration. The invention is adjustable so as to be quickly and easily attached to various size enclosures to measure pressure thereon.

Many pressure measuring transducers are known to the prior art. It is known to measure pressure of an enclosure by measuring the deformation of the enclosure. The deformation measuring pressure transducers of the prior art, however, are not designed to be used accurately on an accelerating system. Deformation measuring transducers have been ineffective to accurately measure pressure during acceleration because forces generated by acceleration cause deformation of the transducer which up to now has been indistinguishable from deformation caused by pressure. Applicant's invention has overcome this acceleration problem by mounting deformation detecting means on a plurality of transducer mounting surfaces in a way that makes it possible to distinguish the deformation of the transducer caused by pressure from that caused by acceleration.

The transducers of the prior art are designed to be permanent parts of the system with which they are associated. They are not readily adjustable to a given enclosure. Applicant's invention is embodied in a form readily adjustable to a variety of enclosures. The ease and rapidity with which it can be applied and removed make it an excellent tool for diagnostic testing and analysis of hydraulic or pneumatic systems. The prior art shows no deformation measuring pressure transducer which accurately measures pressure in a system undergoing acceleration without breaking the surface of the enclosure and which is easily adapted to more than one size enclosure.

SUMMARY OF THE INVENTION

The present invention is shown embodied in an easily attachable clamp structure having one or more deformable members adapted to be held against the periphery of an enclosure and adapted to measure the pressure exerted on the enclosure, without breaking the surface of the enclosure, by measuring the amount of deformation of the member or members. As pressure on the enclosure varies, the periphery of the enclosure expands or contracts with the variation. This expansion or contraction causes deformation of the periphery proportional to the pressure exerted thereon, and the invention measures the enclosure's deformation to obtain a pressure measurement.

The present invention can be used to accurately measure pressure within any enclosure not subject to standing wave phenomena. It is particularly effective as a diagnostic tool for testing of hydraulic or pneumatic pressure systems such as those associated with water and steam lines, natural gas lines, or chemical lines. The invention is useful for testing automotive brake lines, and has application, too, where a remote pressure sensing device is required for locations inconvenient or unsafe for human observers such as radioactive areas or areas subject to extremes of temperature. The device is useful for measuring pressures developed in gun barrels during ballistic testing. In addition the transducer can be used as a pressure monitor for aircraft tires or a pressure cycle counter on apparatus where material fatigue is an anticipated problem. It is also valuable for accurate pressure measurement within an accelerating vehicle.

DESCRIPTION AND OPERATION OF THE PREFERRED EMBODIMENTS

Figures 1, 2:
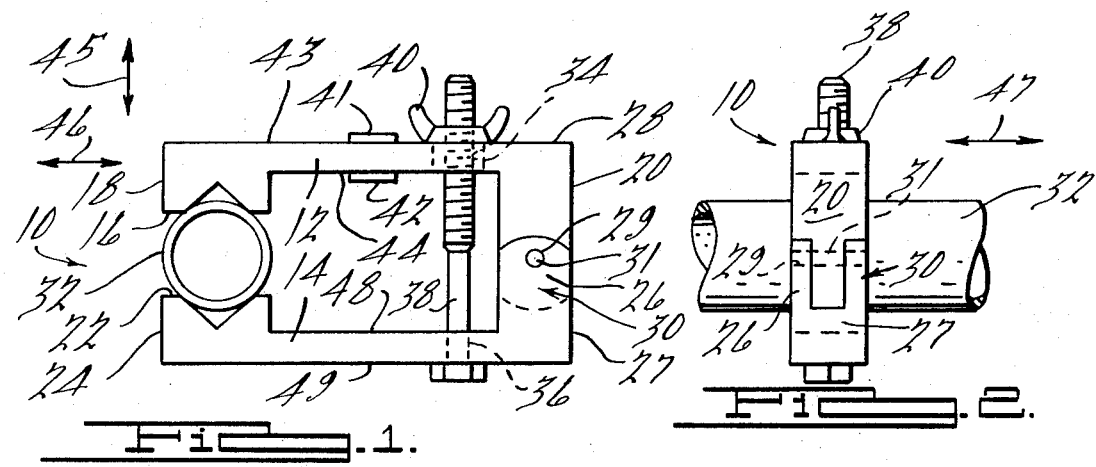
FIG. 1 is a front elevational view of a pressure measuring transducer embodying the present invention shown clamped to a tube whose internal pressure is to be measured.
FIG. 2 is a top view of the transducer of FIG. 1.

The embodiment of the present invention shown as transducer 10 in FIGS. 1 and 2 is designed to be clamped to an enclosure in order to measure pressure exerted thereon and distinguish certain, but not all, accelerations of the tranducer and enclosure from pressure on the enclosure. The transducer, indicated generally at 10, is a U-shaped clamp having first and second members, shown as cantilever arms 12 and 14, at least one of which should be elastically deformable. First cantilever arm 12 has a first V-shaped portion 16 near its free end 18 and an angled hinge portion 20 at its opposite end. Second cantilever arm 14 has a second V-shaped portion 22 at its free end 24 adapted to cooperate with first V-shaped portion 16, and at its opposite end a bifurcated angled hinge portion 26 is joined to arm 14 by connecting portion 27. Arms 12 and 20 make up a frame 28. A bore 29 is formed in the hinge portions 20 and 26, and pin 31 completes the hinge 30 to make cantilever arms 12 and 14 pivotally adjustable to fit an enclosure, here shown as tube 32. Hinge 30 makes V-shaped portions 16 and 22 positionable at varying distances from one another so as to be adjustable for various sizes of enclosure. Arms 12 and 14 have bores 34 and 36 respectively. These bores are aligned to permit a threaded clamping bolt 38 to pass therethrough. Wing nut 40 is threaded onto clamping bolt 38 to fasten transducer 10 securely about tube 32. If it is found necessary to measure the pressure exerted on an enclosure too large for the transducer, as shown, to accommodate, pin 31 is withdrawn from bore 29 and clamping arm 14 replaced by an equivalent arm having a connecting portion longer than present connecting portion 27. Cantilever arm 12 is shown fastened to tube 32 by retaining means comprising V-shaped portions 16 and 22, cantilever arm 14, connecting portion 27, hinge 30, bores 34 and 36, threaded clamping bolt 38, and wing nut 40.

Figure 5:
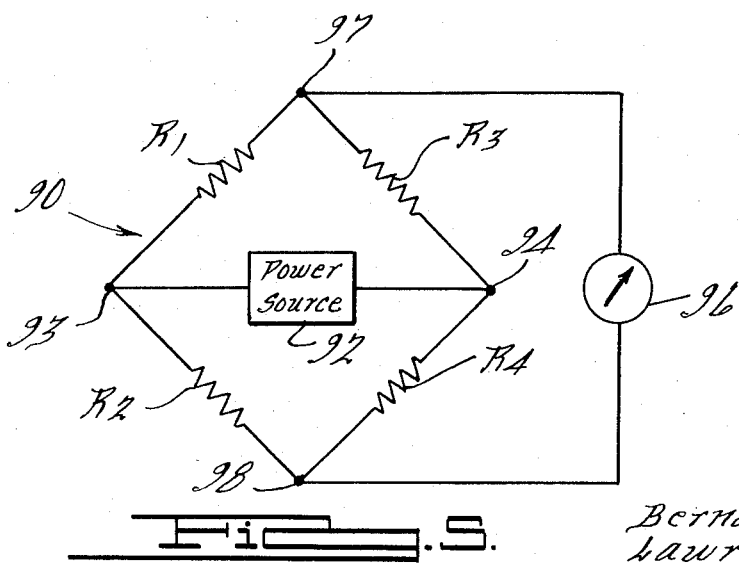
FIG. 5 is an electrical schematic diagram indicating one set of electrical connections usable to obtain a pressure reading from the device of the invention.

Pressure is measured by using deformation detecting means, here shown as one or more strain gages, 41, 42, (FIG. 1) which detects the deformation of arm 12. This deformation is proportional to pressure exerted on tube 32 and causes variation in the electrical resistance of the strain gages 41 and 42. These changes in electrical resistance can be measured by the gages 41 and 42 which are connected as resistances $R_1$ and $R_2$ respectively in a Wheatstone bridge circuit, a simplified version of which is shown in FIG. 5. The resistances $R_3$ and $R_4$ are selected to create a balanced condition of the bridge. This can be done in numerous ways as is well known to those skilled in the art. One way to achieve this balance is to select $R_3$ and $R_4$ equal to one another if $R_1$ and $R_2$ have equal resistances. If one strain gage's resistance increases and the other's resistance decreases, the bridge circuit becomes unbalanced and a voltage difference occurs between points 97 and 98 of the bridge. This voltage is proportional to pressure exerted on tube 32 and is measured by meter 96. When both strain gages 41 and 42 incur equal changes in resistance, whether they be increases or decreases, the bridge circuit maintains its balance and no voltage difference or meter deflection occurs. These equal changes occur when acceleration forces act upon the transducer, as will be explained in greater detail hereafter. Application of these principles permits one to measure tube pressure accurately when the transducer is deformed by acceleration forces.

We have found that strain gages of either resistance wire type, foil type, or semiconductor type function efficiently with the embodiments of the invention described herein. Greatest accuracy and sensitivity are obtainable, however, with semiconductor gages. All these gages are characterized in that their electrical resistance varies with strain. When such gages are tensioned, resistance increases; when compressed, it decreases. Stressed wire or foil strain gages incur maximum resistance variations of approximately two or three percent, while the resistance of semiconductor strain gages may change as much as 20 to 30 percent. For best results the strain gages used on any embodiment of the invention requiring a plurality of gages should be matched gages having substantially identical electrical properties. Matched sets are readily available from manufacturers. Such matching is helpful because deformation of corresponding portions of the transducer are to be compared by means of the change in the electrical properties of the gages, and accuracy can be improved by using gages which respond identically to a given deformation.

Strain gages 41 and 42 (FIG. 1) bonded to parallel mounting surfaces 43 and 44, respectively, of cantilever arm 12, detect deformation of arm 12 in any direction, but, as positioned, deformations of arm 12 in directions 45, 46, and 47 do not produce the same reaction in each strain gage. The gages 41 and 42, as positioned extending in a direction tangential to the periphery of the tube 32, are most sensitive to deformation of arm 12 in directions parallel to arrow 45. When movement of arm 12 in one of the directions of arrow 45 occurs, one strain gage, either gage 41 or 42, is compressed; the other gage is extended as the mounting surfaces 43, 44 are deformed. However, a change in pressure on tube 32 or an acceleration of the transducer in the directions of arrow 45 can produce identical deformations of mounting surfaces 43 and 44. The transducer of FIGS. 1 and 2 therefore cannot distinguish deformation due to acceleration of the transducer in directions 45 from deformation due to pressure. However, the transducer can distinguish acceleration in the direction of arrow 46 (FIG. 1) or 47 (FIG. 2) from pressure effects associated with the tube 32. If the acceleration is in the directions indicated by arrow 46 i.e., parallel to cantilever arm 12, the mounting surfaces 43 and 44 will both be extended or compressed equally, and each gage, 41 or 42, will have its resistance altered equally. This causes no imbalance in the bridge circuit (FIG. 5), and hence the deformation does not register on meter 96. Thus, acceleration of the transducer in the directions indicated by arrow 46 can be distinguished from tube pressure and does not affect the accuracy of the pressure measurement obtained. If arm 12 is deformed in the directions of arrow 47 (FIG. 2) by acceleration forces i.e., in a direction normal to cantilever arm 12 but parallel to the planes of mounting surfaces 43 and 44, the mounting surfaces 43 and 44 will again be stressed equally, and deformation of each mounting surface will be identical. Thus, deformations of arm 12 caused by accelerations in directions 47 are distinguished by the transducer from deformations caused by pressure of the tube 32. The foregoing discussion of the effects of directional deformation of arm 12 on deformation of mounting surfaces 43 and 44 applies equally to mounting surfaces 48 and 49 of arm 14 in the event strain gages are mounted thereon instead of, or in addition to, those now mounted on mounting surfaces 43 and 44. It should be clear to those skilled in the art that acceleration forces in directions other than 45, 46, and 47 can be resolved into components parallel to those direction; the transducer will respond to such components in the manner just described for forces parallel to arrows 45, 46, and 47. The wiring associated with the gages 41 and 42 in FIGS. 1 and 2 has been omitted for simplification, but is well known in the art.

FIG. 5 is a schematic diagram of a Wheatstone bridge circuit 90 with resistances $R_1$, $R_2$, $R_3$, and $R_4$, which can be used to detect changes in the resistance of individual strain gages and convert the changes to an electrical signal proportional to pressure. The circuit 90, as shown, can be used with all embodiments of the invention. Power source 92 which establishes a voltage difference between points 93 and 94 can produce either alternating or direct current.

To use circuit 90 with the embodiment shown in FIGS. 1 and 2 strain gage 41 can be connected as $R_1$ and gage 42 as $R_2$. Resistance values for $R_2$ and $R_4$ are then selected to obtain a balanced condition of the bridge. As will be clear to those skilled in the art, numerous methods of connection can be used in the bridge circuit to obtain such a balanced condition.

In operation, the first embodiment, as shown in FIGS. 1 and 2, is first securely fastened to the periphery of a tube 32. Wing nut 40 is loosened or removed from threaded clamping bolt 38. If necessary, the bolt 38 can be withdrawn from the arms 12 and 14 of the transducer 10 to mount the transducer on tube 32. Arms 12 and 14 are then free to pivot about pin 31 and can be suitably adjusted to the diameter of the tube 32. The tube 32 is aligned between V-shaped portions 16 and 22 and the portions placed in contact with the tube 32. The wing nut 40 is then tightened upon threaded clamping bolt 38 until tube 32 is rigidly secured to the transducer 10. Wing nut 40 is tightened on clamping bolt 38 sufficiently to allow arms 12 and 14 to remain in contact with the tube 32 when the tube 32 undergoes a radial contraction or expansion.

As described above, if two strain gages are mounted on a single arm, as shown in FIG. 1, deformation of the transducer due to certain accelerations can be distinguished from deformations caused by pressure of the enclosure 32. The operation of the apparatus can best be understood by illustration. First, presume that no acceleration effects are present and that the only cause of transducer deformation is pressure within tube 32. As the tube 32 expands due to pressure, the surface 43 (FIG. 1) is compressed and the surface 44 extended. This results in a decrease in resistance of strain gage 41 and an increase in the resistance of strain gage 42. Referring now to the circuit 90 shown in FIG. 5, the strain gage 41 is connected as resistance $R_1$ and gage 42 as resistance $R_2$. The well known Wheatstone bridge circuit shown in FIG. 5 is in a state of balance when the transducer 10 is in an unstressed condition. Under such a balance condition the voltage between points 97 and 98 is zero. When the strain gages 41 and 42 undergo a change in their resistances due to deformation, the circuit 90 becomes unbalanced. A voltage occurs between points 97 and 98 of circuit 90 which is proportional to pressure on the enclosure 32. By measuring this voltage, one easily determines the pressure of the enclosure. Next, we consider the effects of acceleration on the transducer. If the transducer 10 is accelerated in any of the directions indicated by arrows 46 or 47 (FIGS. 1, 2) arm 12 is deformed. This causes a deformation of mounting surfaces 43 and 44. The deformation of each of these surfaces is substantially identical when acceleration forces are in directions parallel to arrow 46. The surfaces are also deformed equally when the acceleration force is parallel to arrow 47. This equal deformation results in an identical change in resistance of each strain gage 41 and 42. Because the resistance change by the same amount, the bridge circuit 90 remains balanced. Thus, accelerations in directions 46 and 47 have no adverse effect on the transducer's ability to measure pressure accurately.

To obtain this result strain gages need not be placed on parallel mounting surfaces, at equal distances from the ends 18 or 24 of arms 12 or 14, respectively, or directly above one another on mounting surfaces of arms 12 or 14. Such placement, however, has been found to be both effective for detecting pressure and economical. If other placements are used, the deformation detecting and measuring means becomes more elaborate. An embodiment using two strain gages mounted on the same arm, but not on the same mounting surface, will permit accurate pressure measurements during certain accelerations, already described, but as will now be shown, the acceleration vectors must be parallel to a single given plane. For example, suppose it is known that all acceleration vectors which a transducer is likely to encounter will be parallel to a single given plane passing through arrow 46 (FIG. 1) and perpendicular to the plane of the drawing paper. To make the transducer 10 immune to such accelerations, mounting surfaces 43 and 44 are formed on arm 12 to be substantially parallel to the single plane and gages 41 and 42 mounted thereon. All acceleration vectors parallel to the given plane will then affect the strain gages 41 and 42 identically. If one gage is compressed, the other will be compressed equally. If one gage is tensioned, the other will be too. Acceleration forces will thus cause identical resistance changes in each strain gage. With each strain gage resistance connected in an arm of the Wheatstone bridge circuit, shown in FIG. 5, the resistance changes balance one another on the bridge, and no voltage between points 97 and 98 is detected by the meter 96. Thus accelerations in a single given plane do not affect the transducer's pressure measuring accuracy. The simplest apparatus for eliminating the effects of acceleration parallel to a single given plane is a transducer having its mounting surfaces parallel to the plane. It is not, however, essential that the mounting surfaces be parallel to the given plane. If they are not, the detection and measuring equipment required to distinguish deformation caused by acceleration of the transducer from deformation caused by pressure becomes substantially more elaborate, but presents no great problem to those skilled in the art. For the embodiment of FIGS. 1 and 2 to detect pressure and remain immune to accelerations within the single given plane, it is necessary that at least one pair of gages be mounted on an arm and that the gages be bonded to two mounting surfaces of that arm.

In the absence of acceleration forces, the transducer of FIGS. 1 and 2 will accurately measure pressure even if the deformation detection means comprises only a single strain gage mounted on arm 12 or 14 instead of a pair, but a single strain gage has less sensitivity than a pair of gages of like characteristics. If no acceleration problems are anticipated, a single strain gage can be used for measuring pressure. In some cases, a single strain gage on a single arm will also be effective for measuring pressure when the transducer is undergoing acceleration. If the acceleration forces generate a much smaller movement of arm 12 or 14 than pressure generates, deformation effects due to acceleration may be so small that the transducer still measures the pressure within tube 32 with acceptable accuracy. It should be noted that acceleration forces in some directions cause less deformation of mounting surfaces 43, 44, 48, and 49 than acceleration forces in other directions. For example, a given acceleration force produces the most deformation of the mounting surfaces if it is parallel to arrow 45. Less deformation of these surfaces is produced if the force is parallel to arrow 47. Still less deformation of the mounting surfaces occurs if the force is parallel to arrow 46. An acceleration in either of the latter two directions may be inadequate to cause sufficient deformation of a mounting surface to substantially affect the accuracy of a pressure measurement even when a single strain gage on a single mounting surface comprises the deformation detecting means. It is quite possible that the deformation of the mounting surfaces caused by enclosure pressure will be substantially greater than that caused by acceleration of the transducer. In such a case, a single gage may be accurate enough to measure pressure exerted on the enclosure while the transducer and enclosure are being accelerated. Of course, a single gage will seldom be as accurate as a pair of properly mounted gages.

If only a single strain gage is used on the embodiment shown in FIG. 1, this strain gage can be mounted on any of the four shown mounting surfaces, 43, 44, 48, or 49. The resistance of this strain gage can be connected as any of the four resistances of the bridge circuit of FIG. 5. If it is connected as $R_1$, the remaining resistances $R_2$, $R_3$, and $R_4$, of circuit 90 are selected to create a balance condition of the bridge. As the mounting surface on which it is bonded is deformed in accordance with movement of arm 12 produced by expansion of tube 32, the resistance of the strain gage, indicated as $R_1$, in FIG. 5, varies and a voltage occurs between points 97 and 98 of the circuit 90. This voltage is easily detected bu the Wheatstone bridge in a manner mentioned earlier and well known to those skilled in the art.

Figures 3, 4:
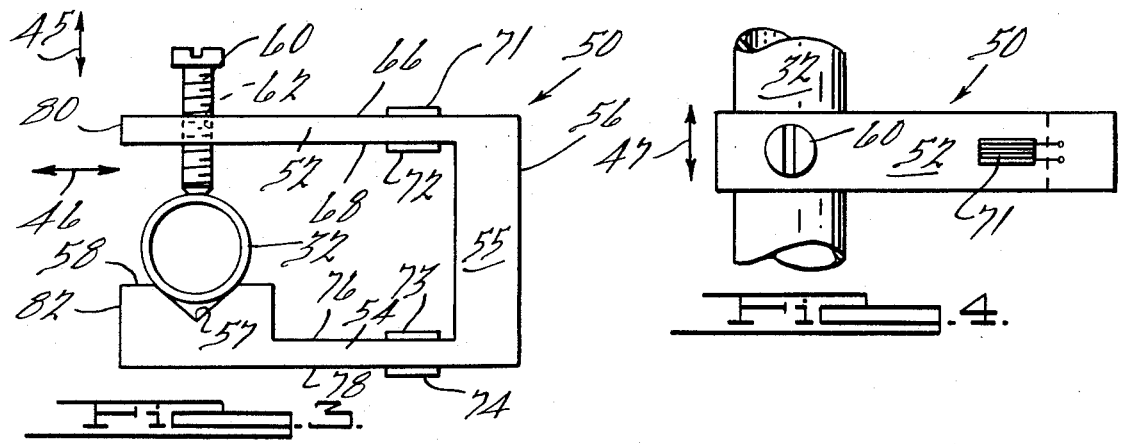
FIG. 3 is a front elevational view of a second embodiment of the invention shown clamped to the same tube of FIG. 1.
FIG. 4 is a right side elevational view of the apparatus of FIG. 3.

Another embodiment of the present invention, shown in FIGS. 3 and 4, is designed to accurately measure pressure exerted on an enclosure and distinguish such pressure from all acceleration phenonema. This embodiment, indicated generally at 50, is a U-shaped clamp having first and second elastically deformable members, shown as first and second cantilever arms 52 and 54 respectively, joined by a connecting portion 55. Arms 52 and 54 and connection portion 55 make up frame 56. Holding means, shown as V-shaped portion 58, cooperating threaded adjusting screw 60 threaded through bore 62 of first cantilever arm 52, and connecting portion 55, securely fasten the arms of transducer 50 against the periphery of an enclosure, here shown as the tube 32.

Deformation detecting means are here shown in the form of strain gages 71, 72, 73, and 74 which are bonded to mounting surfaces 66, 68, 76, and 78, respectively. Although four strain gages are shown in this embodiment, the number can be reduced to two is properly positioned, without adversely affecting the transducer's ability to measure pressure and distinguish all acceleration from pressure if one strain gage is positioned on each arm on corresponding surfaces. The term "corresponding mounting surfaces" refers to strain gage mounting surfaces which when subjected to the same acceleration force, are affected substantially identically, e.g. each such surface is compressed or each extended, and which when subjected to the effect of enclosure pressure are affected substantially oppositely, e.g. one surface is compressed and the other extended or vice versa. Examples of corresponding mounting surfaces are surfaces 68 and 78 or 66 and 76. A transducer having one strain gage on each of two corresponding mounting surfaces will distinguish pressure from acceleration effects. In short, strain gages 71 and 73 can be removed, and 72 and 74 retained, or 72 and 74 removed, and 71 and 73 retained. To distinguish all acceleration effects from pressure, it is essential that at least one strain gage be located on each arm. Corresponding mounting surfaces need not be parallel, but the deformation detecting means becomes more complex and expensive if they are not parallel. For greatest transducer accuracy the gages should be mounted on corresponding mounting surfaces, but this is not essential to the successful operation of the invention.

When gages are mounted on corresponding mounting surfaces of the arms, acceleration forces cause identical deformations on the surfaces, and the two gages experience identical changes in electrical resistance. One of the two gages can be connected as $R_1$ in FIG. 5 and the other as $R_2$. $R_3$ and $R_4$ are selected such that a balanced condition of the bridge is obtained.

To use this embodiment transducer 50 is first securely fastened to the periphery of a tube 32. Threaded adjusting screw 60 is partially withdrawn from first cantilever arm 52 to permit tube 32 to be aligned with the "V" 57 of V-shaped portion 58. When the tube 32 is thus aligned, threaded adjusting screw 60 is tightened upon the tube 32 to securely hold transducer 50 thereon. The screw 60 is tightened upon the tube 32 sufficiently to allow first and second cantilever arms 52 and 54 to remain in contact with the tube 32 as the tube undergoes radial contraction or expansion. When a given acceleration force deforms arms 52 and 54 of the transducer 50, each of the two strain gages is deformed identically. This results in an equal resistance change for each gage, and the balanced bridge circuit 90 of FIG. 5 remains balanced. As is well known to those skilled in the art, so long as no voltage difference occurs between points 97 and 98 of the circuit 90, no reading will appear on the meter 96 in response to acceleration forces.

As the pressure exerted on the tube 32 moves arms 52 and 54 (FIG. 3) radially inward or outward with respect to the tube cross section, the corresponding mounting surfaces are affected oppositely. One is compressed and the other extended to produce an increase in electrical resistance in one gage and a decrease in the other. Such changes cause an unbalanced condition of the bridge circuit 90 (FIG. 5) and a reading appears on meter 96 which is proportional to pressure exerted on tube 32.

As stated earlier, it is possible to make a pressure measuring transducer which distinguishes acceleration deformation from deformation due to pressure even though the two gages are not mounted on corresponding mounting surfaces. For example, in FIG. 3, either gages 72 and 73 or 71 and 74 could be used and the unnecessary remaining pair removed. Such a configuration is not as accurate as a transducer with gages mounted on corresponding mounting surfaces, but is accurate enough for many purposes. If such a mounting arrangement is to be used, it is preferred that gages of the foil or wire type be used rather than semiconductor strain gages. These foil or wire gages have a maximum range of resistance variation of two to three percent. We shall illustrate the theory of operation of such a transducer by an example. For purposes of illustration consider a transducer with gages 72 and 73 mounted on mounting surfaces 68 and 76, respectively, although we could with equal facility have selected gages 71 and 74 mounted on surfaces 66 and 78 for our example. By properly connecting the resistances of the gages in the Wheatstone bridge circuit of FIG. 5, as will be described hereafter, an excellent approximation of pressure exerted on tube 32 is possible with the described transducer even in the presence of acceleration forces. One strain gage resistance is connected as $R_1$ and the second as $R_4$. $R_2$ and $R_3$ are selected to obtain a balanced condition of the bridge. One way to do this is to have $R_2$ equal $R_3$. This connection arrangement works well because of the small variations in resistance associated with wire or foil strain gages. We now presume, for purposes of illustration, that the unstressed resistance of these wire or foil gages is 120 ohms each ($R_1 = R_4 = 120$ ohms), and that the voltage between points 93 and 94 is 1 volt. Presume that $R_2 = R_3 = 120$ ohms. We next presume that a typical acceleration causes a one percent variation in the electrical resistance of gages 72 and 73. Further presume that the strain gage 72, associated with $R_1$, is compressed and that the gage 73, associated with $R_4$, extended. Under strain, resistances $R_1$ and $R_4$ change by approximately 1 percent or 1.2 ohms to 121.2 ohms and 118.8 ohms respectively. Using the above figures we next determine the voltage at points 97 and 98. To do so we presume point 93 is at zero volts potential.

$V_{97} = [1 \text{ volt}][R_1/R_1 + R_3] = 121.2/121.2 + 120 = 0.50249$ volts $V_{98} = [1 \text{ volt}][R_2/R_2 + R_4] = 120/120 + 118.8 = 0.50251$ volts Magnitude of voltage between points 97 and 98 = $[V_{98} - V_{97}] = 0.00002$ volts It is clear the acceleration produces an electrical signal of $\pm 0.00002$ volts.

We next consider the transducer's behavior in response to pressure exerted on the enclosure. Presume a pressure deformation of the transducer occurs which is sufficient to cause a one percent change in electrical resistance of the gages. $R_1$ and $R_4$ change by 1.2 ohms. $R_1$ and $R_4$ increase to 121.2 ohms each.

$V_{97} = [1 \text{ volt}] R_1/R_1 + R_3 = 121.2/121.2 + 120 = 0.50249$ volts $V_{98} = [1 \text{ volt}] R_2/R_2 + R_4 = 120/121.2 + 120 = 0.49751$ volts Magnitude of voltage between points 97 and 98 $= |[V_{98} - V_{97}]| = 0.00498$ volts.

A change in pressure exerted on the transducer sufficient to cause a 1 percent change in the electrical resistances of the strain gages thus generates an electrical signal of $\pm 0.00498$ volts. It should be noted that voltage changes produced by pressure variations are far more substantial than those attributable to acceleration forces.

This embodiment utilizing non-corresponding mounting surfaces will not function effectively if large magnitude resistance changes occur in the circuit 90. Because of this characteristic the embodiment is not well suited to semiconductor strain gages which exhibit resistance changes of 20 to 30 percent. As should be clear form the example illustrated above, the described embodiment owes its successful operation to the small variation in electrical resistance attributable to foil or wire strain gages.

In the event four gages are desired for increased sensitivity as shown in FIG. 3, the mounting surfaces 66 and 68 are preferably, but not necessarily, located on opposite sides of the arm 52, and the gages 71 and 72 are positioned at equal distances away from the free end 80 of arm 52. By so positioning gages 71 and 72 a deformation of arm 52 toward or away from arm 54 produces equal but opposite deformations of gages 71 and 72. Arms 52 and 54 are here shown parallel to one another but need not be parallel. Strain gages 73 and 74 are bonded to mounting surfaces 76 and 78, respectively, located on arm 54. Preferably, but not necessarily, the surfaces 76 and 78 are located on opposite sides of the arm 54 and the gages 73 and 74 are positioned at equal distances from the free end 82 of arm 54. It is not essential that the mounting surfaces 66, 78, 76, and 78 be parallel to one another, although this embodiment shows them as being parallel. In this embodiment the distance from gages 73 or 74 to the free end 82 of arm 54 is equal to the distance from gages 71 or 72 to the free end 80 of arm 52, although this equality is not essential to the successful operation of the device. In the preferred embodiment, the arm thicknesses separating mounting surfaces 66 and 68 and mounting surfaces 76 and 78 are equal although this is not essential to successful operation of the invention. In the preferred embodiment cross-sectional construction of arms 52 and 54 are identical in the vicinity of gages 71, 72, 73, and 74, and the mounting surfaces 66, 68, 76, and 78 on which the gages are bonded are parallel. Such identity and parallelism are not essential to the invention. The structure of the shown embodiment, however, makes it possible to distinguish acceleration from pressure with a minimum of detection and measurement equipment. Departure from the shown embodiment may require additional equipment which would otherwise be unnecessary. It has been found that acceleration effects are most simply eliminated if the mounting surfaces to which the strain gages are bonded are in parallel planes.

It should be understood that the two-piece frame 28 shown in FIGS. 1 and 2 can accommodate four strain gages just as the one-piece frame 56 shown in FIGS. 3 and 4. The two frame constructions are interchangeable alternatives with the invention.

To use the circuit 90 (FIG. 5) with the four strain gage embodiment shown in FIGS. 3 and 4, strain gage 71 is electrically connected in the bridge circuit 90 as $R_1$, gage 72 as $R_2$, gage 73 as $R_3$, and gage 74 as $R_4$. Since the strain gages are a matched set, each has substantially the same resistance value. Voltage detecting means, here shown as meter 96, detects and measures the voltage between points 97 and 98 of the Wheatstone bridge circuit 90. As is well known in the art, the voltage between points 97 and 98 will be identical and the meter 96 will read zero volts potential difference unless the transducer 50 is deformed to cause the resistances of $R_1$, $R_2$, $R_3$, and $R_4$, to change, thereby creating a voltage difference between points 97 and 98 of circuit 90.

The transducer 50 (FIG. 3) distinguishes deformation due to acceleration of transducer and enclosure from deformation caused by pressure by detecting deformation of mounting surfaces 66, 68, 76, and 78. For example, when pressure within tube 32 causes the tube to radially expand, arms 52 and 54 and are forced radially outward as the tube expands; mounting surfaces 66 and 78 are compressed while mounting surfaces 68 and 76 are extended. The strain gages 71 and 74 on mounting surfaces 66 and 78, respectively, undergo a decrease in electrical resistance; gages 72 and 73 on mounting surfaces 68 and 76, respectively, undergo an increase in electrical resistance. Since gage 71 is connected as resistance $R_1$ (FIG. 5), gage 72 as $R_2$, gage 73 as $R_3$ and gage 74 as $R_4$, the voltage between points 97 and 98 will no longer be identical when the gages are stressed. The resistances of $R_1$ and $R_4$ decrease and those of $R_2$ and $R_3$ increase as the transducer is deformed by pressure. As is well known in the art, this brings about an imbalance in the circuit 90, and a voltage differential is established between points 97 and 98 which is proportional to pressure within tube 32. If transducer 50 is subjected to acceleration vectors in any direction, mounting surfaces 71 and 73 undergo identical deformations; surfaces 72 and 74 are also deformed equally, but oppositely to surfaces 71 and 73. This causes $R_1$ and $R_3$ to undergo equal resistance changes as do $R_2$ and $R_4$. Since the resistances $R_1$ and $R_3$ change equally, the voltage distribution between points 93 and 94 is unchanged. $R_2$ and $R_4$ also change equally and the voltage distribution across them also undergoes no change. Thus no voltage change occurs between points 97 and 98 and acceleration of the transducer 50 does not produce any reading on meter 96.

The result is that acceleration does not affect the accuracy of the pressure measuring transducer.

While two strain gages, properly positioned, are required to distinguish all acceleration deformation from deformation caused by pressure, pressure alone could be measured using only a single strain gage mounted on any of the mounting surfaces already indicated in FIG. 3 just as was described with the embodiment of FIGS. 1 and 2. If no serious problems with acceleration are anticipated, a single strain gage is adequate to determine the pressure upon the enclosure.

All embodiments of the invention can measure either changes in pressure or absolute pressure having a conventional zero level, i.e. the zero level being atmospheric pressure or vacuum. To measure such absolute pressure, it is necessary, of course, to calibrate the meter 96 in appropriate units and establish a zero pressure reference level. This can be accomplished by well known calibration means.

While we have described the preferred embodiments of the present invention, it should be understood that various changes, adaptations, and modifications may be made therein without departing from the spirit of the invention and the scope of the appended claims.

Having thus described our invention, we claim:

1. A transducer for detecting pressure exerted upon the periphery of an elastically deformable enclosure comprising:
   a member elastically deformable in response to deformation of the periphery of the enclosure;
   means drivingly engaging said member with the periphery of the enclosure including a second member which cooperates with said first mentioned member to grip the enclosure therebetween, and also including means pivotally connecting said members and means to adjustably secure the enclosure between said members; and
   deformation detecting means adapted to detect deformation of said first member to thereby detect pressure exerted on the periphery of the enclosure.

2. The combination according to claim 1 wherein said deformation detecting means is mounted on said first and said second members.

3. The combination according to claim 2 wherein said deformation detecting means includes at least one strain gage having electrical properties proportional to deformation of one of said members.

4. A transducer for detecting pressure exerted upon the periphery of an elastically deformable enclosure subject to acceleration comprising:
   first and second elastically deformable members;
   means holding said members against the periphery of the enclosure at spaced points thereon such that said members will be moved towards or away from each other in response to deformation of the periphery of the enclosure; and
   detecting means adapted to detect movement of said members toward or away from each other due to deformation of the enclosure.

5. The combination according to claim 4 wherein said first and second members are substantially parallel, cantilever arms having substantially identical cross sections.

6. The combination according to claim 4 wherein said holding means includes means pivotally connecting said members and means adjustably securing the enclosure between said members.

7. The combination according to claim 4 including conversion means to convert signals from said detecting means generated by movements of said members toward or away from each other into a measurement of pressure.

8. The combination according to claim 7 wherein said conversion means is electrical circuit means.

9. The combination according to claim 5 wherein said identical cantilever arms have at least one mounting surface on each arm adapted to support said deformation detecting means thereon, said mounting surfaces being mutually parallel.

10. The combination according to claim 9 wherein said detecting means include a set of two matched strain gages having substantially identical electrical characteristics, one gage being mounted on each arm on a mounting surface thereon.

11. The combination according to claim 10 wherein said two strain gages are mounted on corresponding mounting surfaces.

12. The combination according to claim 10 wherein said two strain gages are mounted on non-corresponding mounting surfaces.

13. The combination according to claim 5 wherein each of said cantilever arms is provided with two mounting surfaces, the mounting surfaces being mutually parallel, and wherein said detecting means is a set of four matched strain gages having substantially identical electrical characteristics, one gage being mounted on each mounting surface.

14. A transducer for detecting pressure exerted upon the periphery of an elastically deformable enclosure comprising:
   a member elastically deformable in response to deformation of the periphery of the enclosure;
   means drivingly engaging said member with the periphery of the enclosure including a second member which cooperates with said first mentioned member to grip the enclosure, and also including means to adjustably secure the enclosure between said members; and
   deformation detecting means adapted to detect deformation of said first member to thereby detect pressure exerted on the periphery of the enclosure.

15. A transducer for measuring pressure in an enclosure free from the effects of accelerations along at least one direction comprising:
   deformation detecting means including a structure drivingly engaged with said enclosure, and also including means causing deforming of respective portions of said structure oppositely in response to deformation of said enclosure periphery;
   mounting means mounting said structure with respect to said portions and said at least one direction of acceleration so that said portions are deformed substantially identically by said accelerations; and
   output signal means providing an output signal corresponding to the extent of opposite deformation of said portions, whereby a signal indicative of the deformation of said enclosure periphery and substantially unaffected by accelerations along said at least one direction is provided.

16. The combination according to claim 15 wherein said elastically deformable structure is a cantilever arm extending in a tangential direction to said periphery of said enclosure and wherein said portions of said structure are upper and lower surfaces of said cantilever arm.

17. The transducer of claim 16 wherein said mounting means mounts said cantilever arm extending parallel to said at least one direction of acceleration whereby said surfaces are affected identically by said acceleration.

18. The transducer of claim 16 wherein said mounting means mounts said cantilever arm extending normally to said at least one direction and parallel to the planes of said upper and lower surfaces whereby said surfaces are affected identically by said acceleration.

19. The combination according to claim 15 wherein said structure includes first and second members which are substantially parallel, cantilever arms having substantially identically cross sections.

20. The combination according to claim 19 wherein said holding means includes means pivotally connecting said cantilever arms and means adjustably securing the enclosure between said cantilever arms.

21. pipe pressure measuring apparatus including a pair of spaced clamping arms, means joining said clamping arms for allowing movement of said arms toward and away from one another, readily releasable clamping means on said arms and including pipe engaging portions for clamping a pipe between said arms, said readily releasable clamping means enabling said pipe pressure measuring apparatus to be readily moved and positioned along said pipe, measuring means including strain gauge means responsive to movement of said arms, and indicating means for indicating the pressure within said pipe connected with said strain gauge means.

22. Apparatus as defined in claim 21 wherein said clamping arms extend substantially parallel with one another.

23. Apparatus as defined in claim 21 including adjusting means for adjusting a portion of the clamping means to adjust the amount of applied pressure.

24. Apparatus as defined in claim 21 wherein said means joining said arms is positioned substantially midway between the outer ends of said clamping arms.

25. Apparatus as defined in claim 21 wherein said strain gauge means comprises a plurality of individual strain gauges, at least one of said strain gauges being in tension upon movement of said arms, and at least another of said strain gauges being in compression upon movement of said arms.

26. Apparatus as defined in claim 25 wherein each of said strain gauges is connected in a bridge circuit, said bridge circuit being connected with said indicating means.

27. Apparatus as defined in claim 21 wherein said clamping arms and said means joining said arms comprise a substantially U-shaped one-piece construction.

28. The method of measuring pressure in a piping system comprising the steps of:
a. clamping a readily releasable and movable measuring apparatus on the outer surface of a pipe in the piping system at a particular point therein;
b. detecting deflection of the pipe wall caused by pressure within said pipe at said point; and
c. measuring the pressure within said pipe at said point as a function of said pipe wall deflection at said point, said measuring apparatus being readily movable to other points in said piping system and clamped to the pipe point to measure the pressure at such other point.

29. The method as defined in claim 28 wherein:
a. said measuring apparatus is attached to said pipe wall in a manner not to disturb said piping system or to puncture or otherwise deform said pipe wall and said pressure is measured as a function of diametrical expansion of said pipe wall.

* * * * *